United States Patent
Scheiter

[15] 3,684,065
[45] Aug. 15, 1972

[54] TRANSMISSION AND CLUTCH CONTROL

[72] Inventor: Milton H. Scheiter, Bloomfield Hills, Mich.

[73] Assignee: General Motors Corporation, Detroit, Mich.

[22] Filed: Nov. 23, 1970

[21] Appl. No.: 91,891

[52] U.S. Cl. .............. 192/3.52, 74/691, 192/113 B, 74/861
[51] Int. Cl. ......................................... B60k 21/00
[58] Field of Search .............. 192/3.52; 74/690, 691

[56] References Cited

UNITED STATES PATENTS

| | | | |
|---|---|---|---|
| 2,164,504 | 7/1939 | Dodge | 74/690 |
| 2,181,380 | 11/1939 | Pollard | 74/691 |
| 2,646,696 | 7/1953 | Kepes | 74/691 |
| 3,406,597 | 10/1968 | Perry et al. | 74/691 |
| 3,494,224 | 2/1970 | Fellows et al. | 74/691 |

*Primary Examiner*—Benjamin W. Wyche
*Attorney*—Warren E. Finken, A. M. Heiter and John P. Moran

[57] ABSTRACT

A traction drive transmission comprising input and output shafts; an input race secured to the input shaft for rotation therewith; an output race rotatably mounted on the input shaft; a plurality of tiltable rollers mounted in frictional contact at the edges thereof with the input and output races; a planetary unit including ring, sun, planet pinion and carrier members, the direction of rotation of the carrier member being determined by roller tilt position and relative sun and ring member speeds; clutch means for at times operatively connecting the carrier member to the output shaft; and hydraulic control means for tilting the rollers in response to signals indicative of predetermined engine parameters and for engaging the clutch means to rotate the output shaft in one direction in response to a first signal indicative of a first predetermined tilt angle portion of the total tilt angle range of the rollers and for rotating the output shaft in the opposite direction in response to a second signal indicative of a second predetermined tilt angle portion of the total tilt angle range of the rollers, and for disengaging the clutch means in response to a third signal indicative of the remaining portion of the total tilt angle range of the rollers, there being a predetermined, infinite torque, tilt angle position in the latter tilt angle portion at which the speeds of the ring and sun are substantially equal and the planet pinions are stationary.

20 Claims, 6 Drawing Figures

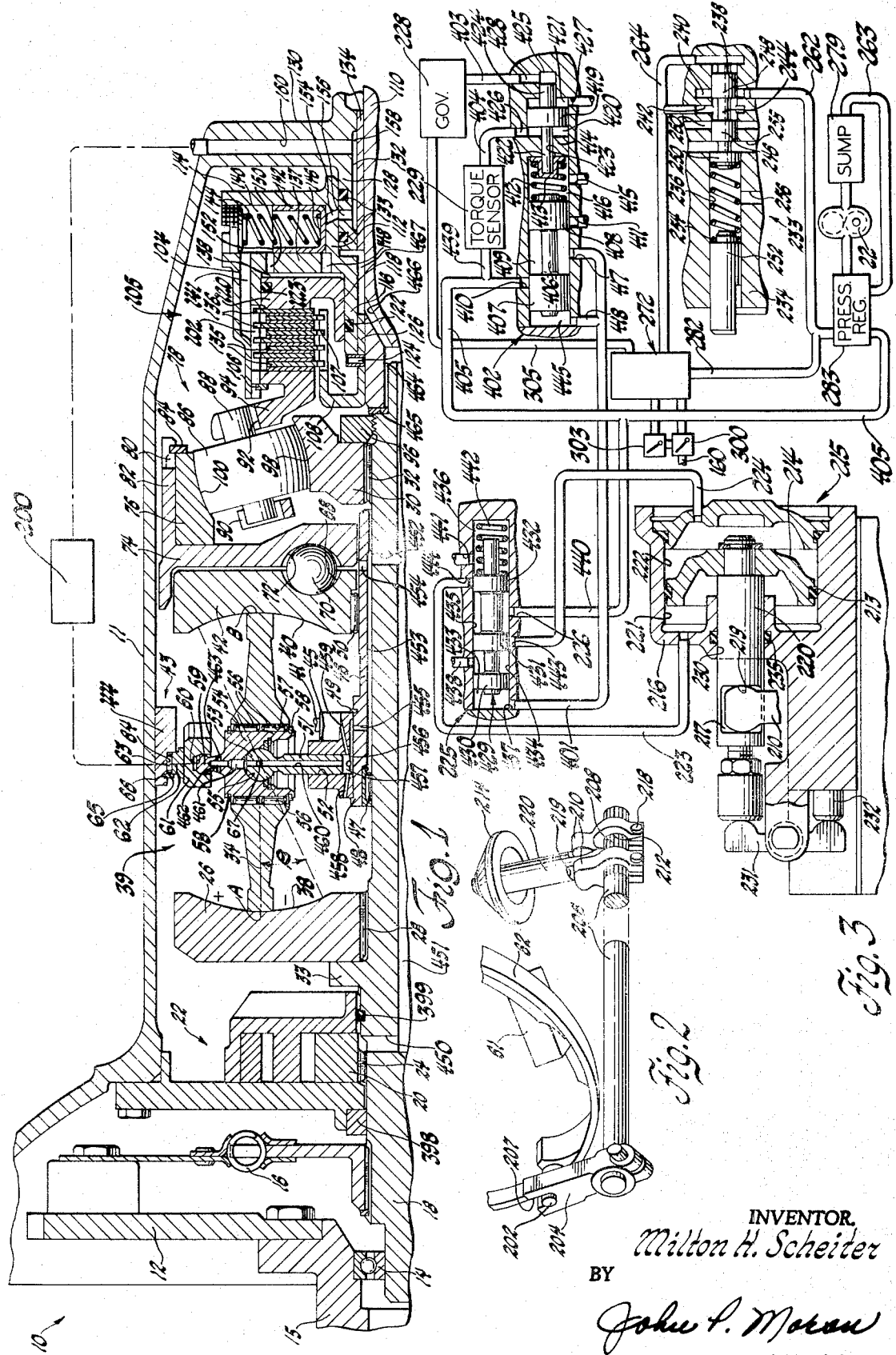

TRANSMISSION AND CLUTCH CONTROL

This invention relates to transmissions and, more particularly, to a traction-drive type transmission.

A general object of the invention is to provide an improved traction-drive type transmission including a "toric" race and roller section coupled with a planetary friction drive section, and including a clutch arrangement, the combination constituting an infinitely variable torque ratio device wherein the output will pass through "zero" speed, providing both forward and reverse variable speeds.

Another object of the invention is to provide the above-described combination, wherein the clutch is disengaged during a first range of roller tilt angle positions intermediate the forward and reverse ranges.

A further object of the invention is to provide the above-described combination, wherein the clutch is disengaged during the range of roller tilt angle positions at which the respective torque ratios are beyond a practical limit and/or approaching infinity.

A still further object of the invention is to provide an improved forward and reverse traction-drive mechanism, wherein the feedback load is prevented from being transmitted back to the input contact between the rollers and the input race during the period of infinite torque ratio, as well as during any time that there is excessive sudden feedback from the vehicle, such as might be encountered when the wheels momentarily leave and return to the road.

Still another object of the invention is to provide a traction-drive transmission including a toric unit, a planetary unit, an associated clutch arrangement, and control means for engaging the clutch to connect the output of the planetary unit to the output shaft for rotating the output shaft in one direction during a first tilt angle range of the rollers, for disconnecting the carrier from the output shaft during a second tilt angle range of the rollers, and for once again engaging the clutch to connect the carrier member to the output shaft for rotating the output shaft in the opposite direction during a third tilt angle range of the rollers.

A still further object of the invention is to provide a traction-drive mechanism, wherein the contact velocities of the ring and sun members of the planetary unit are equal and opposite at a predetermined tilt angle of the rollers of the toric unit, with the planet carrier remaining stationary, during the above-described second tilt angle range of the rollers.

These and other objects and advantages of the invention will be apparent when reference is made to the following description and accompanying drawings, wherein:

FIG. 1 is a cross-sectional view of a transmission employing both toric and planetary units and embodying the invention;

FIGS. 2–4 illustrate the hydromechanical control system embodied in the invention.

Figure 4:
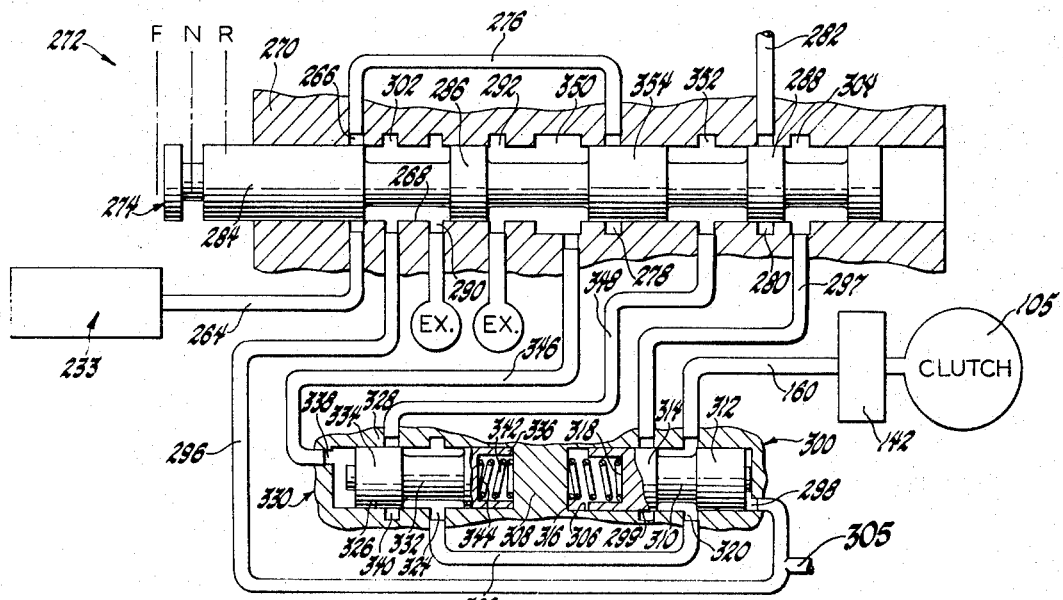

Referring to the drawings in greater detail, FIG. 1 illustrates a regenerative roller traction-drive mechanism 10 including a housing 11 and a flywheel 12 mounted on bearings 14 and secured to an extension 15 driven by a suitable prime mover (not shown), such as a gas turbine engine, for example. A conventional torsional damper 16 is driven by the flywheel 12 and, in turn, drives an input shaft 18 on which the bearings 14 are mounted. The input shaft 18 drives an input gear 20 of an oil pump 22 through splines 24, an input race 26 through splines 28, and an input sun member 30 through splines 32. A collar 33 is formed on the input shaft 18 adjacent the radially innermost outer surface of the input race 26.

A plurality of disc-type or "toric" rollers 34 are mounted such that the edges thereof are intermediate and in frictional contact with respective toroidal surfaces 38 and 40 formed on the adjacent input race 26 and on an oppositely disposed output race 42.

Considering now the means which supports and tilts the rollers 34, an assembly 39 of the type illustrated and described in U.S. Pat. No. 3,581,587 which issued on June 1, 1971, in the name of Frank Dickenbrock, may be employed. Each roller 34 is a part of the assembly 39 which includes a support or spider member 43. An outer ring portion 44 of the spider member 43 may be secured to the housing 11 or may be mounted thereon by splines (not shown) to prevent relative rotation. A central hub portion 45 is secured to the outer ring 44 by means of three equally spaced spoke members 41. The spoke members 41 are located alternately with the rollers 34. A cylindrical member 46 is mounted around the transmission input shaft 18 supporting bearings 47, and is press-fitted into the central hub portion 45. The cylindrical member 46 is restrained from axial movement by a collar 48 formed on an end of the member 46 and a retaining ring 49 mounted in a groove formed in the outer surface of the member 46. The member 46 extends into the central opening formed in the output race 42 and rotatably supports the race 42 on needle bearings 50. A support mast 51 is press-fitted in each of three radial openings 52 formed in the central hub member 45 and has a ball-shaped pivot 53 at the end thereof which extends into the center of each of the rollers 34. A roller carrier 54 is universally pivotally mounted on the support mast 51 by a socket 55 which engages the ball-shaped pivot 53, with the degree of pivoting thereon being limited by centrally located pins 57. Needle bearings 56 are located in an axial opening 57 formed in each of the rollers 34 to rotatably support the rollers 34 on the carrier 54. Retaining rings 58, located adjacent the end faces of the rollers 34, retain the needle bearings 56 in the desired axial position but permit axial relative movement of the rollers 34 on their respective roller carriers 54 for proper tracking and load equalization. Each roller carrier 54 includes an extension member 59 which extends radially outwardly therefrom into one of a plurality of slots or grooves 60 formed in a cam member 61 secured to a ratio control collar 62. The slots or grooves 60 in the cam member 61 are angularly disposed relative to the collar 62 and the axis of the input shaft 18. The ratio control collar 62 is rotatably mounted on needle bearings 63 in an annular groove 64 formed on the inside surface of the outer ring portion 44 of the spider member 43, the ratio control collar 62 being axially located therein by means of a retaining ring 65 mounted in a groove 66 formed in the outer ring 44.

A ramp-like surface 68 is formed on the back side of the output race 42. A ball member 70 is mounted between each ramp surface 68 and an oppositely disposed ramp surface 72 formed on a flange member 74. An outer ring member 76 of a planetary unit 78 is secured in any suitable manner, such as by splines 80, within a cylindrical extension 82 formed on the drive flange 74 for rotation therewith. A retainer ring 84 retains the outer ring member 76 against a face of the drive flange 74. A plurality of planet pinions 86 are rotatably confined between the outer ring member 76 and the input sun member 30 and are mounted on shafts 88 whose ends extend through the planet pinions 86 and into aligned openings 90 and 92 formed in a carrier 94. The input sun member 30 is restrained from moving rightwardly on the input shaft 18 by a nut 96 threadedly mounted adjacent the end of the shaft 18. The planet pinions 86 are retained in place axially by oppositely disposed arcuate-shaped surfaces 98 and 100 formed on the input sun member 30 and the outer ring member 76, respectively. The arcuate-shaped surfaces 98 and 100 are formed in such a manner that the axis of each planet pinion shaft 88 will bisect the angle formed by the tangents of surfaces 98 and 100, which angle has its apex on the axis of the input shaft 18.

Circumferentially spaced, laterally extending spline members 102 project leftwardly in FIG. 1 to engage the carrier 94 within an outer clutch drum 104 of a limited slip clutch mechanism 105. A retainer ring 106 mounted adjacent a face of the carrier 94 prevents the carrier 94 from moving leftwardly in FIG. 1. A plurality of spaced, laterally extending members 107 extend from a cylindrical hub member 108 mounted around and secured to an output shaft 110. A first internally extending central hub portion 112 is formed to extend from an end wall 114 of the outer clutch drum 104. A second smaller diameter internally extending central hub portion 116 is formed on the inner end of the hub portion 112, extending concentrically through an inner hub member 118 of a piston 120, the latter being slidably mounted on the hub portion 116 and within the outer clutch drum 104. A seal 122 prevents leakage between the piston 120 and the hub portion 116, while a seal 123 prevents leakage between the piston 120 and the outer clutch drum 104. A thrust washer 124 is mounted around the output shaft 110 and between the adjacent ends of the hub portion 116 and the cylindrical member 108, while a bearing 126 is mounted between the hub portion 116 and the output shaft 110. The first central hub portion 112 of the clutch drum 104 is rotatably mounted on a central hub member 128 formed axially inwardly from an end wall 130. The output shaft 110 extends through an axial opening 132 in the hub 128 and is supported therein by a bushing 134. A pair of seals 133 prevent leakage between the adjacent hub members 112 and 128. Alternately spaced clutch plates 135 and 136 are secured for rotation with the clutch hub 108 and the outer clutch drum 104, respectively, between the slidably mounted piston 120 and the right-hand face (FIG. 1) of the carrier 94.

A fixed inner wall member 137 of the clutch drum 104 forms a chamber 138 adjacent the right end (FIG. 1) of the piston 120. A second chamber 140 is formed in the clutch drum 104 between the fixed inner wall 137 and the end wall 114. A passage 141 communicates between the chamber 140 and the clutch plates 135 and 136 for lubrication purposes. A cup-shaped, centrifugally actuated clutch-apply valve 142 is slidably mounted in the chamber 140 and urged radially inwardly therein by a spring 144 mounted within the clutch-apply valve 142 adjacent the bottom inner surface 146 thereof. The members 102, 104, 106, 114, 116, 118, 136, 137, 142, and 144 at all times rotate within the carrier 94, while the members 108 and 135 rotate with the output shaft 110.

It may be noted that the axial loads required for tractive drive are self-contained, i.e., such loads are transmitted from both axial directions through the respective frictional contact paths to the support mast 51 of each roller assembly 39, and thence radially outwardly to ground, thereby optimizing efficiency and response.

A first port 148 is formed through the fixed inner wall 137 adjacent the end 146 of the valve 142, communicating between the chambers 138 and 140. A second port 150 is formed in the fixed inner wall 137 adjacent the outer edge 152 of the valve 142, also communicating between the chambers 138 and 140. A port 154 and a radial opening 156 are formed in the hub members 112 and 128, respectively, intermediate the two seals 133. A longitudinal opening 158 is formed in the member 128, communicating between the radial opening 156 and a passage 160 formed radially outwardly in the wall 130.

As will be explained, fluid at a given pressure for use adjacent the centrifugal apply-valve 142 and the piston 120 is provided by a suitable hydromechanical control system represented at 200, and illustrated in detail in FIGS. 2-4. The control system 200 is operatively connected between the ratio control collar 62 and the chamber 138, via openings 160, 158, 156, port 154, the chamber 140, and the ports 148 and 150, in a manner described hereinafter, to provide a hydraulic or pneumatic force adjacent the piston 120 to move the latter in response to suitable hydraulic signals indicative of particular ranges of tilt angles of the rollers 34.

CONTROL SYSTEM

The hydromechanical control system 200 of FIG. 1 is illustrated in greater detail in FIGS. 2-4. Specifically, referring now to FIG. 2, it may be noted that the cam members 61 and their slots or grooves 60 are angularly disposed on the ratio control collar 62. It may be further noted that a pin member 202 is secured to the collar 62. A crankarm 204 is formed on the end of a shaft 206. The crankarm 204 includes a slot 207 formed therein into which the pin member 202 extends. A splined section 208 is formed on the other end of the shaft 206. A pair of bellcranks 210, each having internal splines 212 formed therein, are mounted on the splined portion 208. A servopiston 214 extends from a housing 216 (FIG. 3) of a servocontrol assembly 215. The servopiston 214 has flats 217 formed on opposite sides thereof for pivotal confinement between the bellcrank members 210. The members 210 are secured to the shaft 206 by any suitable means, such as bolts 218, the axial position of the shaft 206 being determined by flats 217. Accordingly, any reciprocal movement of the servopiston 214 caused by the hydraulic signal, which will be described later, will transfer motion to the bellcrank members 210 by intimate contact with surfaces 219 formed on a shaft or stem 220, causing rotation of the bellcrank members 210, along with the crankarm member 204. Rotation of the crankarm member 204 will act upon the pin 202, located in the slot 207, to rotate the ratio control collar 62.

Referring now to the servocontrol system 215 of FIG. 3, the servopiston 214 serves as a slidably mounted movable wall between the variable chambers 221 and 222 formed in the housing 216. A seal 213 is mounted around the servopiston 214. Lines 223 and 224 communicate with the chambers 221 and 222, respectively, directing fluid signals thereto which reflect the combined engine speed and engine torque parameters at any time. The lines 223 and 224 lead from a flow control assembly 225 which receives line pressure via a port 226 during forward and reverse operation, as will be explained, as well as a sensor pressure via a line 401 leading from a main ratio valve assembly 402. The latter assembly, in turn, receives an engine speed signal via a line 403 from a governor assembly 228, and a torque signal via a line 404 from a gasifier discharge pressure valve assembly or other torque-responsive mechanism 229, as well as fluid at regulated line pressure via a line 405 from the pressure regulator 283. A branchline 439 communicates between the line 405 and the torque sensor 229.

More specifically, the main ratio valve assembly 402 includes a spool valve 406 having lands 407 and 408 forming an intermediate chamber 409 and cooperating with an inlet port 410 from the line 405 and an exhaust port 411, respectively. The spool valve 406 is urged leftwardly in FIG. 3 by a spring 412 which is retained at its other end by a spring retainer 413 adjacent a fixed abutment 414. An exhaust port 415 communicates with the spring chamber 416. An outlet port 417 communicates between the chamber 409 and the line 401, while a branchline 418 communicates between a chamber 445, located to the left of the land 407 in FIG. 3, and the line 401.

A second valve 419 is included in the main ratio valve assembly 402, slidably mounted therein to form two variable chambers 420 and 421. A stem 422 is formed on the left face (FIG. 3) of the valve 419, extending through an opening 423 formed through the fixed abutment 414 into contact with the spring retainer 413. Another stem 424 is formed on the right face (FIG. 3) of the valve 419, extending into an axial chamber 425. An inlet port 426 communicates between the torque-sensor passage 404 and the chamber 420. An exhaust port 427 extends from the chamber 421 and a port 428 communicates between the governor passage 403 and the chamber 425.

Referring now to the flow control assembly 225 in FIG. 3, it may be noted that the assembly 225 includes a valve 429 having lands 430, 431 and 432 separating variable chambers 433, 434, 435 and 436. An inlet port 437 communicates between the line 401 and the chamber 433. An exhaust 438 serves to exhaust the chamber 434. The port 226 communicates with the chamber 435 from a branch passage 440 from the main line passage 405. An exhaust port 441 exhausts from the chamber 436. A spring 442 is mounted in the chamber 436 between the end of the chamber 436 and the adjacent face of the land 432. Outlet ports 443 and 444 communicate with the lines 223 and 224.

The lines 223 and 224 lead to the servocontrol assembly 215 and are at times blocked off by the lands 431 and 432. At other times the lines 223 and 224 alternately transmit signals to the respective chambers 222 and 221 of the assembly 215, calling for decreased tilt angle $\beta$ and increased tilt angle $\beta$, respectively. Besides affecting the ratio control collar 62, as a result of movement of the servopiston 214, the stem 220 extending from the servopiston 214 through an opening 230 in the housing 216, which is suitably sealed by a seal 235, terminates against one end of a pivotably mounted lever 231, whose other end contacts the exposed extension 232 of a plunger 252 of a ratio position valve assembly 233 (FIG. 3). The bellcrank members 210 cooperate with the flat surfaces 217 and 219 formed on the servopiston stem 220 such that the members 210 receive a rotary movement about the axis of the shaft 206 in response to a reciprocal movement of the servopiston 214.

Referring now to FIG. 3, the ratio position valve assembly 233 generates a fluid pressure proportional to the tilt angle of the toric rollers 34. The assembly 233 includes a housing 234 having two concentric bores 236 and 238, as well as an inlet port 240 and an outlet port 242 formed therein. A spool valve 244 includes two smaller diameter lands 246 and 248 and one larger diameter land 250 for sliding movement in the bores 236 and 238, the land 250 being in the bore 236. The plunger 252 is slidably mounted in the larger bore portion 236, the plunger 252 including the extension 232 which is contacted by the lever 231 of the servopiston assembly 215. A spring 254, having predetermined rate and force factors, is mounted between opposing ends of the spool valve 244 and the plunger 252. Exhaust ports 256, 258 and 260 are formed in the housing 234. Line pressure is supplied from a sump 279 by the pump 22 via a regulating valve 283 to the bore 238 of the ratio position valve assembly 233 via a passage 262. A bypass line 263 communicates between the sump 279 and the pressure regulator 283 around the pump 22.

Referring now to FIG. 4, it may be noted that a line 264 communicates between the ratio position valve assembly 233 and an inlet port 266 of a bore 268 formed in a housing 270 of a manual selector valve assembly 272. The latter assembly 272 includes a valve member 274 slidably mounted in the bore 268. A line 276 communicates between the inlet port 266 and another inlet port 278. Line pressure from the source 279 (FIG. 3) supplied by the pump 22 via the regulating valve 283 through lines 262 and 282 is communicated to an inlet port 280 (FIG. 4) formed adjacent the bore 268. The ports 266, 278 and 280 are controlled by lands 284, 286 and 288, respectively, formed on the valve member 274.

Exhaust ports 290 and 292 are formed in the housing 270 and alternately controlled by a land 286 formed on the valve member 274. A pair of lines 296 and 297 communicate between ports 298 and 299 of a forward clutch valve assembly 300 and ports 302 and 304 formed in the housing 270 and controlled, as will be explained, by the lands 284 and 288, respectively. A branchline 305 communicates between the line 296 and the governor 228 (FIG. 3).

The forward clutch valve assembly 300 includes a bore 306 formed in a housing 308 and a spool valve 310 slidably mounted herein. Lands 312 and 314 are formed on the valve 310 adjacent the ports 298 and 299, respectively. A spring 316 urges the valve 310 to the right in FIG. 4, abutting against the left recessed end 318 of the land 314. The line 160 (FIG. 1) communicates between the clutch-apply valve 142 adjacent the clutch 105 and a port 320 formed in the housing 308 intermediate the lands 312 and 314.

A line 322 communicates between the port 320 and a port 324 formed adjacent a bore 326 in a housing 328 of a reverse clutch valve assembly 330. The latter assembly 330 includes a valve member 332 slidably mounted in the bore 326 and having lands 334 and 336 formed thereon on opposite sides of the port 324. A pair of ports 338 and 340 are formed in the housing 328 adjacent the land 334. A spring 342 urges the valve 332 to the left in FIG. 4, abutting against the right-hand recessed end 344 of the valve 332. Lines 346 and 348 communicate between the ports 338 and 340 and ports 350 and 352, respectively, of the manual selector valve assembly 272, adjacent opposite ends of a land 354, with the land 288 controlling communication between the port 352 and the line inlet port 280.

As will be explained, the valve 274 may be slidably positioned in forward (F), neutral (N) or reverse (R) positions in the bore 268.

The oil pump 22, driven by the input shaft 18, supplies lubricant from the sump 279 through a radial port 450 to a central passage 451. Seals 398 and 399 are located on opposite sides of the port 450. A branch passage 452 directs the lubricant from the central passage 451 to an annular passage 453 between the shaft 18 and the cylinder member 46 to lubricate the bearing 47. Lubricant also flows from the annular passage 453 through a radial passage 454 to the ball member 70 and the ramp surfaces 68 and 72. Lubricant also flows from the annular passage 453 through a branch passage 455 to interconnecting annular passages 456 and 457 formed in the hub 45. From the passage 457, lubricant flows through a passage 458 to the toroidal surface 38, through a passage 459 to the toroidal surface 40, and through a radial passage 460 in the mast 51 to the pin 67 and the ball-shaped pivot 53. Lubricant thence flows around the pin 67 through an opening therefor formed in the carrier 54 to lubricate the needle bearings 56. An aligned radial passage 461 communicates between the radial passage 460 and passages 462 and 463 to provide lubricant to the extension 59 in the slot 60.

A recess 464 formed in the output shaft communicates with passage 451 and supplies lubricant to a thrust washer 465 between the input and output shafts 18 and 110, respectively. A branch passage 466 communicates between the central passage 451 and an annular space 467 between the output shaft 110 and the hub 116 to provide lubricant for the bearings 126, 134 and 124.

OPERATION

Referring first to FIG. 1, input from a suitable prime mover, such as a gas turbine engine (not shown), is transmitted therefrom via the extension 15, the flywheel 12 and the torsional dampener 16 to the input shaft 18 and thence to the input race 26. If such input is assumed to be in a clockwise direction, as viewed from the left end of the drawing, the disc rollers 34, which frictionally engage the toroidal surface 38, will be caused to rotate in a counter-clockwise direction, as viewed from the top. The rotating disc rollers 34 will, in turn, cause the output race 42 to rotate in a counter-clockwise direction by virtue of their frictional engagement with the toroidal surface 40.

At this point, it may be appreciated that if the roller 34 is tilted between the toroidal surfaces 38 and 40, the speed of the output race 42 will be varied accordingly. For example, if the left contacting edge A of each roller 34 is moved radially outwardly along the toroidal surface 38 while the right edge B is moved radially inwardly along the toroidal surface 40, there will result an increased output speed for a given input speed. Conversely, if the tilted positions of the respective contacting edges A and B are reversed, there will result a decreased output speed, but with all the components continuing to rotate in the same respective directions.

To accomplish the tilting operation, it is conventional to cause the disc rollers 34 to first be inclined between the respective input and output races 26 and 42 as a result of rotation of the ratio control collar 62 in a manner to be described. The resultant tractional effect on the contacting edges A and B of each roller 34 will cause the rollers to tilt in response thereto, while the extension member 59 slides along the angled slot or groove 60 until it once again arrives at the centerline, thereby removing all the inclination from the system. The inclining/tilting operation and structure suitable therefor, as described above, is covered in above-mentioned U.S. Pat. No. 3,581,587, and will be discussed to some extent below.

The output race 42, rotating as described above, will drive the flange member 74 in the same counter-clockwise direction and at the same rotary speed through the ball members 70. The latter will have positioned themselves intermediate the converging ramp surfaces 68 and 72 at a location reflective of the torque being transmitted as a result of the load on the system, forcing the input race 26 and the input sun member 30 against the collar 33 and the nut 96, respectively, and producing a "squeeze" effect on the planet pinions 86 as a result of their predetermined angular positions and the roller-race contact of the toric system 39.

Counterclockwise rotation of the flange member 74 will, of course, drive the associated outer ring member 76 in the same counterclockwise direction. Rotation of the latter will, in turn, exert a first rotational influence on the planet pinions 86, while rotation of the input sun member 30 by the input shaft 18 will exert a second clockwise rotational influence thereon. The resultant speed and direction of rotation of the pinion shafts 88 and the carrier 94, and, thus the output shaft 110, will be determined by the relative speeds of the outer ring member 76 and the input sun member 30. In other words, the input sun member 30 will always be rotating at the same speed as the input shaft 18, while the speed of the outer ring member 76 will be the same as, greater than, or less than the speed of the input shaft 18, depending upon the above-described tilted positions of the disc rollers 34 between the toroidal surfaces 38 and 40.

Figure 6:
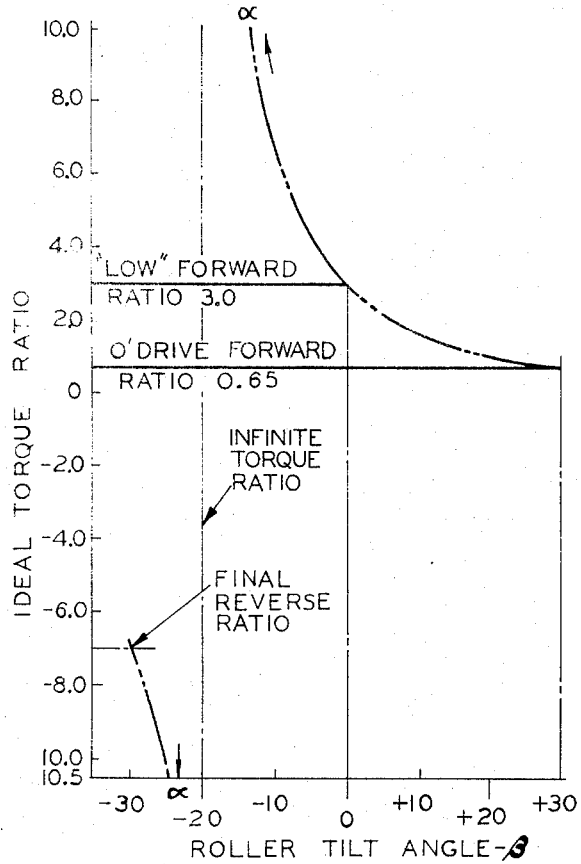
FIGS. 5 and 6 are diagrammatic views of operational characteristics of the invention.

For the following discussion, the angle of tilt of the plane of the disc rollers 34 relative to the plane perpendicular to the input race 26, and as measured from the substantially fixed center of the roller, has been designated as $\beta$. Radial outward movements of the roller 34 edge A along the toroidal surface 38 of the input race 26 are designated $+\beta$, while radial inward movements thereof are designated as $-\beta$ (FIG. 6).

Figure 5:
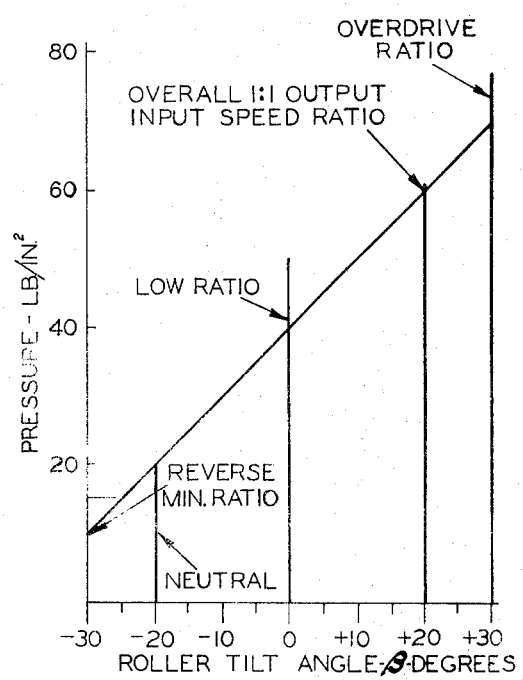

Now, at some predetermined angle of tilt, $\beta$, say $-20°$, contact velocities of the outer ring member 76 and the input sun member 30 are equal and opposite in direction, with the result that the carrier 94 and the output shaft 110 stand still and the system is in neutral (FIG. 5). Beyond $-20°$, i.e., for larger negative angles, the resultant speed ratio between the outer ring member 76 and the input sun member 30 causes the planet pinions 86 to "walk around" the respective sun and ring members 30 and 76 in a reverse direction as compared to the direction of rotation of the input shaft 18, thus causing the output shaft 110 to reverse its direction of rotation.

Considering now the overall operation, and including the operation of the limited slip clutch mechanism 105, it is apparent that with the disc rollers 34 positioned in the horizontal plane, as illustrated, there would be a 1:1 output race 42-to-input race 26 speed ratio. However, considering the incorporation of the fixed-radii planetary unit 78 intermediate the output race 42 and the output shaft 110, it is apparent that a 1:1 output shaft 110-to-input shaft 18 speed ratio would require that the disc rollers 34 be positioned at some tilt angle $\beta$ other than 0, or off the horizontal plane. If, for example, the respective input and output races 26 and 42 are designed so that a maximum $\beta$ angle of $+30°$ or $-30°$ is possible when the disc rollers 34 are contacting the toroidal surfaces 38 and 40 at the respective radially innermost and outermost edges thereof, radii may be selected for the various components such that the disc rollers 34 would be positioned at, say, $+20°\beta$ for the 1:1 overall output/input speed ratio (FIG. 5).

It is further understandable that tilting movement of the rollers 34 from $0°\beta$ to $+30°$ could cover the desired overall speed and/or torque ratio range of, for example, 3.0 torque ratio or 0.33 speed ratio, with the rollers 34 positioned horizontally, to 0.65 torque ratio or 1.54 speed ratio with the rollers 34 positioned at a $+30°\beta$ for forward operation. Throughout such forward operation, the clutch mechanism 105 would, of course, be engaged.

For reverse operation, the rollers 34 are manually tilted through the $-\beta$ range, the external control system 200 being such that for a signal indicative of a predetermined range of, say, from $0°$ to $-25°\beta$, the hydraulic pressure in the first chamber 138 will have been relieved, as will be explained, thus permitting the piston 120 to move to the right in FIG. 1 to disengage the clutch plates 135 and 136. This ensures the availability of a true neutral, compensates for any variation due to frictional drag or manufacturing tolerances in the point at which the input sun member 30 and ring member 76 should rotate at identical speeds, and prevents any feedback load from being transmitted back to the input contact between the edges A of the disc rollers 34 and the toroidal surface 38 while the rollers 34 travel through the above-described $-20°\beta$ sun 30 and ring 76 equal-contact velocity position at which point there is an infinite torque ratio.

Once the predetermined angle of $-25°\beta$ is reached, the control system 200, in conjunction with the centrifugal action of the clutch-apply valve 142, will once again cause a hydraulic force to be transmitted to the chamber 138 sufficient to move the piston 120 to the left in FIG. 1, re-engaging the clutch plates 135 and 136. As the disc rollers 34 continue to tilt from $-25°$ to $-30°\beta$, the predetermined desired reverse speed ratio will be attained at the $-30°$ tilt angle (FIGS. 5 and 6).

It is apparent that the sun member 30, the ring member 76 and the carrier 94 are not limited structurally to being operatively connected to the input shaft 18, the flange member 74 and the output shaft 110, respectively, but may, if desired for other ratios and ratio ranges be adapted to being connected to any other of the three latter members.

The clutch mechanism 105 is designed such that the clutch plates 135 and 136 will slip any time there is excessive sudden feedback from the vehicle, such as might be encountered when the wheels momentarily leave and return to the road. This prevents such feedback from causing the edges A of the rollers 34 to slip on the adjacent toroidal input surface 38.

A particular forward speed ratio range may, if desired, be increased substantially by having the external control system 200 and the clutch-apply valve 142 arranged to disengage the clutch plates 135 and 136 at, say, a $-10°\beta$, rather than at the above-mentioned $0°\beta$, or horizontal roller 34 position.

Selection of suitable "toric" and planetary units radii may be made in accordance with the following analysis, wherein:

$S_o$ = speed of output shaft 110;
$S_i$ = speed of input shaft 18;
$S_r$ = speed of output race 42 and ring 76;
$S_p$ = speed of rollers 34;
$S_{pl}$ = speed of planet pinions 86;
$R_s$ = radius from input shaft 18 axis to contact surfaces between sun 30 and planet pinions 86;
$R_p$ = radius of planet pinions 86;
$R_r$ = radius from input shaft 18 axis to contact surfaces between ring 76 and planet pinions 86;
$R_i$ = radius from input shaft 18 axis to contact surfaces between rollers 34 and input race 26; and
$R_2$ = radius from input shaft 18 axis to contact surfaces between rollers 34 and output race 42.

Assuming the sun member 30 to be held fixed,
$S_o R_s + S_{pl} R_p = S_r R_r$.
Assuming the ring member 76 to be held fixed,
$S_o R_s - S_{pl} R_p = S_i R_s$.
Adding these two relationships,
$S_o(R_r + R_s) = S_r R_r + S_i R_s$.
We may now consider the output race 42 speed in terms of the ratio of toric section contacting radii multiplied by input speed, or,
$S_r = -[R_i/R_2]S_i$,
Substituting,
$S_o(R_r + R_s) = -[R_i/R_2]S_i R_r + S_i R_s$.
Solving for $S_o/S_i$, $$\frac{S_0}{S_i} = \frac{\dfrac{R_s}{R_r} - \dfrac{1}{R_2/R_i}}{1 + \dfrac{R_s}{R_r}}$$

Now, for the sake of simplicity, let
$D = R_s/R_r$ and $R = R_2/R_i$.

Substituting, $$\frac{S_o}{S_i} = \frac{D - \frac{1}{R}}{1+D}.$$

It should be apparent that by using the latter equation, suitable radii for both the toric and planetary units may be determined for a desired output/input speed in a given transmission application.

It should be further apparent that the invention provides an infinitely variable torque ratio device, i.e., the output can pass through "zero" speed, and that both forward and reverse variable speeds are possible, as well as neutral, the roller-planetary arrangement serving as a bearing during the neutral or disengaged clutch operation.

Insofar as the detailed operation of the hydromechanical control system 200 is concerned, it should first be realized that the ratio position of the rollers 34 (FIG. 1) will be varied in response to a hydraulic signal from the servocontrol system 215 (FIG. 3) wherein hydraulic line pressure is supplied from the sump 279 by the pump 22 (FIG. 3) via the lines 405 and 440 to the port 226. Line pressure from the pressure regulator 283 is also directed by the line 405 to the inlet port 410 of the main ratio valve 402 and by the branchline 439 off the line 405 to the torque-responsive mechanism 229, while ratio position pressure is directed by the line 264 to the manual selector valve assembly 272 and thence via the lines 296 and 305 (FIG. 4) to the governor 228. Speed and torque signals are transmitted from the governor 228 and the torque sensor 229 to the main ratio valve assembly 402 via the lines 403 and 404, respectively. The resultant pressure transmitted from the main ratio valve assembly 402 to the flow control valve assembly 225 is thus influenced by variations in engine speed and torque. The latter may be any one of compressor discharge pressure, pitot tube pressure, rack position, throttle position or vacuum, as applicable.

Specifically, signals varying with speed and torque parameters are transmitted from the governor 228 and the torque sensor 229 via the lines 403 and 404, respectively, to the respective chambers 425 and 420 of the assembly 402, causing the plug valve 419 to respond accordingly. The valve 419, in turn, by means of the stem 422 and the intermediate spring 412, influences the position of the main ratio valve assembly 402 with respect to varying the pressure entering from the port 410 past the land 407 and correspondingly varying the exhaust through the port 411 past the land 408. A proper signal, indicative of the speed and torque parameters, is thus transmitted from the chamber 409 via the outlet port 417 and the line 401 to the chamber 433 of the flow control valve assembly 225 where it acts on the end face of the land 430 of the flow control valve 429.

The flow control valve assembly 225 receives line pressure via the port 226 from the pressure regulator 283 via lines 405 and 440 (FIG. 3). Consider for a moment that fluid at line pressure has been received in the chamber 435 via the port 226. Such pressure will thereupon be transmitted from the chamber 435 either past the edge of the land 431 and through the outlet port 443, or past the edge of the land 432 and through the outlet port 444, as determined by the combined speed and torque reflective pressure in the chamber 433. A transmission of fluid through the port 443 resulting from a decrease in pressure in the chamber 433, and thence through the line 224 to the servochamber 222 will move the servopiston 214 to the left in FIG. 3, exhausting the chamber 221 via the line 223, the port 444, the chamber 436 and the exhaust port 441. This will move the stem 220 and cause the rotation of the bellcranks 210, the shaft 206 (FIG. 2) and the crankarm 204. Rotation of the latter will, through the pin member 202, rotate the ratio control collar 62 and result first in the inclination and then the tilt of the rollers 34 via the respective cam members 61, the grooves 60, the extension members 59, and the carriers 54 in the well-known manner to produce a decreased speed ratio. An increased speed ratio will result from the transmission of fluid from the flow control valve assembly 225 through the outlet port 444 and the line 223 to the chamber 221 to the right of the servopiston 214, exhausting the chamber 222 via the line 224, the port 443, the chamber 434 and the exhaust port 438.

Consider, now, that the manual selector valve 274 (FIG. 4) has been positioned for reverse operation. Flow from the line 264 to the line 296 will thereupon be blocked off, preventing any flow through the branchline 305 to the governor 228 (FIG. 3). Such action will eliminate any speed signal influence from being transmitted from the governor 228 via the main ratio valve assembly 402 through the line 401 to the left end chamber 433 (FIG. 3) of the flow control valve assembly 225. Accordingly, the spring 442 will force the valve 429 all the way to the left. Line pressure from the chamber 435 will thereupon flow through the port 443 and the line 224 to the servochamber 222 to move the servopiston 214 leftwardly so as to produce a tilt of the rollers 34 to their largest $-\beta$ position, i.e., with the left edge A (FIG. 1) of the rollers 34 at their most radial inward location along the toroidal surface 38, as will be explained below, producing a constant reverse output/input speed ratio.

Now, insofar as the present invention is concerned with respect to a means for engaging and disengaging the clutch mechanism 105 to avoid torques approaching infinity (FIG. 6), it may be noted in FIG. 3 that the above-mentioned motion of the stem 220 is effectively transferred via the pivotally mounted lever 231 to the extension 232 of the plunger 252. As illustrated in FIG. 4, movement of the latter will, through the spring 254, move the ratio position spool valve 244 to vary the line pressure entering through the line 262 into the space between the lands 246 and 248. The resultant pressure will be transmitted via the outlet port 242 to the line 264.

As illustrated in FIG. 4, the fluid pressure in the line 264 will be communicated to the port 266 of the manual selector valve assembly 272. Consider now that if the valve member 274 is positioned in neutral (N), inlet of the pressure from the ratio position valve assembly 233 in line 264 to the bore 268 is blocked by the lands 284 and 354, while inlet of line pressure in the line 282 is blocked by the land 288, and, hence, the clutch-apply valve 142 cannot be actuated to engage the clutch mechanism 105. During this phase, the exhaust ports 290 and 292 are open to the lines 296 and 346, respectively.

Now, consider that the valve member 274 (FIG. 4) is manually positioned in forward (F). Ratio position pressure is determined by the movement of the ratio valve member 244 (FIG. 3) relative to inlet port 240 to which line pressure is communicated via the line 262, in response to movement of the plunger member 252 and the intermediate spring 254 as influenced by the servopiston 214 through the stem 220 and the pivotal lever 231. In other words, since the servopiston 214 determines roller 34 tilt angle $\beta$ by rotating the ratio control collar 62 (FIGS. 1 and 2) as described above, since the stem 220, lever 231 and plunger 252 are direct-acting therefrom, the resultant variable spring 254 (FIG. 3) force acting on the ratio valve member 244 produces a hydraulic pressure that is directly proportional to roller position. Such pressure is communicated from the ratio position valve assembly 233 through the line 264 to the ports 266 and 302 and, thence, via the line 296 to the inlet port 298 of the forward clutch valve assembly 300. Once the ratio position pressure reaches 40 psi (see FIG. 5), the valve member 310 will move to the left in FIG. 4, overcoming the force of the spring 316 and permitting line pressure from the line 282 to enter the space between the lands 312 and 314 via the ports 280 and 304, the line 297, and the port 299. Such line pressure is then communicated through the port 320 and the line 160 to the centrifugal clutch-apply valve 142 (FIG. 4) to effect the engagement of the clutch mechanism 105. The line pressure from lines 282 and 297 is also communicated via the branchline 305 to the port 226 leading into the servosystem control unit 225 to signal forward operation to the servocontrol valve position thereof.

More specifically, as may be noted in FIG. 1, passages 158, 156, and 154 communicate line pressure from the line 160 to the lower chamber 140 beneath the centrifugal clutch-apply valve 142. As the latter valve moves radially outwardly under the action of centrifugal force against the force of the spring 144, line pressure is permitted to be directed through the first port 148 in the wall 137 to the first chamber 138. So long as the upper second port 150 remains open, the fluid entering the chamber 138 will pass through the port 150 into the radially outer portion of the chamber 140 and thence through the passage 141 to the clutch plates 135 and 136, serving as coolant therefor. Once engine speed becomes such that the port 150 is shut off by the valve 142, pressure in the chamber 138 will have built up sufficiently to have moved the piston 120 to the left (FIG. 1) to engage the clutch plates 135 and 136. Coolant will thereupon no longer be required. At this point, the rollers 34 will have reached the "zero" tilt angle position (FIG. 5) and may then proceed toward a + 30°$\beta$ tilt angle or 0.65 overdrive ratio, the output shaft 110 being rotated in the vehicle-oriented "forward" direction via the planetary unit 78, as explained above.

Next, consider that the valve member 274 (FIG. 4) is manually positioned for reverse (R) operation. Ratio position pressure, as described above, is communicated from the ratio position valve assembly 233 through the line 264 around the annular port 266, through the passage 276 and the ports 278 and 350, between the lands 286 and 354, to the line 346 and, thence, through the inlet port 338 of the reverse clutch valve assembly 330 to the portion of the bore 326 adjacent the left face (FIG. 4) of the valve member 332. Once the ratio position pressure drops to 15 psi (see FIG. 5), the valve member 332 will be moved to the left by the spring 342, permitting line pressure from the line 282 to enter the space between the lands 334 and 336 via the ports 304 and 352, the line 348, and the port 340. Such line pressure is then communicated through the port 324, the line 322, the annular port 320, and the line 160 to the centrifugal clutch-apply valve 142 (FIG. 4) to cause the engagement of the clutch mechanism 105 in the same manner as discussed above. It should be noted that line pressure from lines 282 and 348 will be communicated via the branchline 356 to the line 227 (FIG. 3) of the servocontrol unit 225 in order to position the servocontrol valve portion thereof as required for reverse operation.

The rollers 34 will have been moved in the −$\beta$ direction and, upon reaching the −25°$\beta$ tilt angle, the output shaft 110 will be rotated in the reverse direction via the planetary unit 78, as explained above, when the centrifugally operated valve 142 is activated.

In summary, the clutch mechanism 105 cannot be engaged while the roller 34 tilt angle $\beta$ is between 0° and −25° (FIGS. 1 and 5) and, furthermore, cannot be engaged once either the 0° or −25° position is reached until respective 15 psi or 40 psi ratio position pressures have been attained. Hence, as is more apparent in FIG. 6, the clutch mechanism 105 remains disengaged, not only at the angle at which infinite torque ratio is reached, i.e., −20°$\beta$, but throughout the range of roller tilt angles during which torque ratios are large and damage could occur in the transmission, if the clutch 105 were engaged.

While but one transmission and control system therefor have been shown and described, other modifications thereof are possible.

I claim:

1. A transmission comprising input and output shafts, an input race secured to said input shaft for rotation therewith, a rotatably mounted output race, a plurality of tiltable rollers mounted in frictional contact at the edges thereof with said input and output races, means for tilting said rollers intermediate said input and output races, a planetary unit including first, second and third rotatable members, one of said first, second and third rotatable members being operatively connected to said output race for rotation members being of said first, second and third rotatable members being secured to said input shaft for rotation therewith, control means for producing signals indicative of predetermined tilt angle ranges of said roller positions between said races, and means for operatively connecting and disconnecting the last of said first, second and third rotatable members to said output shaft for rotating said output shaft in respective forward and reverse directions in response to particular tilt angle range signals.

2. The transmission described in claim 1, wherein said last of said first, second and third rotatable members remains stationary when the contacting velocities of said one of and said another of said first, second and third rotatable members are equal and opposite in direction, and with said last of said first, second and third rotatable members reversing in direction relative to said one of and said another of said rotatable members at contact velocities of said one rotatable member below the contact velocities of said another rotatable member.

3. The transmission described in claim 1, wherein said last-mentioned means includes a friction clutch mechanism operatively connected between said last of said first, second and third rotatable members and said output shaft.

4. The transmission described in claim 1, wherein said control means includes a servopiston movable in response to various engine parameters to set the required tilt angle of said rollers, ratio position valve means directly movable in response to movement of said servopiston to transmit a fluid pressure signal indicative of tilt angle, piston means for actuating said friction clutch mechanism, forward and reverse clutch valve means responsive to predetermined fluid pressures, and manual selector valve means for receiving said fluid pressure signal from said ratio position valve means and directing same to one of said forward and reverse clutch valve means, said one of said forward and reverse clutch valve means directing said fluid pressure signal to said piston means for engagement of said friction clutch mechanism upon attainment of said predetermined fluid pressures.

5. The transmission described in claim 4, and a centrifugally-actuated apply valve operatively connected between said forward and reverse clutch valve means and said piston means for controlling the application of said fluid pressure signal on said piston means in response to centrifugal force.

6. A transmission comprising input and output shafts, an input race secured to said input shaft for rotation therewith, a rotatably mounted output race oppositely disposed from said input race, a plurality of tiltable rollers mounted in frictional contact at the edges thereof with said input and output races, means for tilting said rollers intermediate said input and output races, a planetary unit including first, second and third rotatable members, said first rotatable member being operatively connected to said output race for rotation therewith, said second rotatable member being secured to said input shaft for rotation therewith, first means for operatively connecting and disconnecting said third rotatable member to said output shaft for rotating said output shaft in forward and reverse directions in response to the tilting of said rollers along said races through respective predetermined tilt angle ranges, and second means for automatically actuating said first means during said respective predetermined tilt angle range positions.

7. The transmission described in claim 6, wherein said third rotatable member remains stationary when the contact velocities of said first and second rotatable members are equal and opposite in direction, and with said third rotatable member reversing in direction at contact velocities of said first rotatable member below the contact velocities of said second rotatable member.

8. A transmission comprising input and output shafts, an input race secured to said input shaft for rotation therewith, an output race rotatably mounted on said input shaft, a plurality of tiltable rollers mounted in frictional contact at the edges thereof with said input and output races, means for tilting said rollers intermediate said input and output races, a planetary unit including ring, sun and planet pinion members, one of said ring, sun and planet pinion members being operatively connected to said output race for rotation therewith, another of said ring, sun and planet pinion members being secured to said input shaft for rotation therewith, first means for operatively connecting and disconnecting the last of said ring, sun and planet pinion members to said output shaft for rotating said output shaft in both rotary directions in response to the tilting of said rollers along said races through respective predetermined tilt angle ranges, and second means for automatically actuating said first means during said respective predetermined tilt angle range positions.

9. A transmission comprising input and output shafts, an input race secured to said input shaft for rotation therewith, an output race rotatably mounted on said input shaft, a plurality of tiltable rollers mounted in frictional contact at the edges thereof with said input and output races, means for tilting said rollers intermediate said input and output races, a planetary unit including ring, sun and planet pinion members, said ring member being operatively connected to said output race for rotation therewith, said sun member being secured to said input shaft for rotation therewith, control means for producing signals indicative of predetermined tilt angle ranges of said roller positions between said races, and means for operatively connecting and disconnecting said planet pinion members to said output shaft for rotating said output shaft in respective forward and reverse directions in response to particular tilt angle range signals.

10. The transmission described in claim 9, wherein the axes of said planet pinion members remain stationary with respect to the axis of said input shaft when the contact velocities of said ring member and said sun member are equal and opposite in direction, and with said planet pinion members reversing in direction at contact velocities of said ring member below the contact velocities of said sun member.

11. A transmission comprising input and output shafts; an input race secured to said input shaft for rotation therewith; an output race rotatably mounted on said input shaft; a plurality of tiltable rollers mounted in frictional contact at the edges thereof with said input and output races; means for tilting said rollers intermediate said input and output races; a planetary unit including ring, sun and planet pinion members, said ring member being operatively connected to said output race for rotation therewith, said sun member being secured to said input shaft for rotation therewith; and means for automatically connecting said planet pinion members to said output shaft for rotating said output shaft in one direction in response to the tilting of said rollers through a first predetermined tilt angle portion of the total tilt angle range of said roller positions between said races, and for automatically connecting said planet pinion members to said output shaft for rotating said output shaft in the opposite rotary direction in response to the tilting of said rollers through a second predetermined tilt angle portion of the total tilt angle range of said roller positions between said races, and for automatically disconnecting said planet pinion members from said output shaft in response to the tilting of said rollers through the remaining portion of the total tilt angle range of said roller positions between said races.

12. The transmission described in claim 11, wherein said last-mentioned means includes a friction clutch mechanism operatively connected to said planet pinion members and control means for engaging and disengaging said clutch mechanism.

13. The transmission described in claim 12, and a carrier member operatively connected between said planet pinion members and said friction clutch mechanism, said carrier member serving to maintain said planet pinion members in a spaced individually-rotating relationship and adapted to be rotated about the axis of said input shaft in response to rotation of said planet pinions about said axis of said input shaft.

14. The transmission described in claim 11, wherein said first predetermined tilt angle portion of the total tilt angle range is the range included between a right angle relationship between the movable plane of said rollers and the fixed plane of said input race and a 30° relationship between said movable plane and said fixed plane, said 30° being measured at the center of said rollers and extending radially outwardly of said right angle position along said fixed plane of said input race.

15. The transmission described in claim 11, wherein said second predetermined tilt angle portion of the total tilt angle range includes an angular relationship between the movable plane of said rollers and the fixed plane of said input race of from approximately 25° to approximately 30° as measured at the center of said rollers, said 25° and 30° positions being located radially inwardly of the point at which said movable and fixed planes are in a perpendicular relationship and along said fixed plane.

16. The transmission described in claim 11, wherein said third predetermined tilt angle portion of the total tilt angle range is the range included between a right angle relationship between the movable plane of said rollers and the fixed plane of said input race and a 25° relationship between said movable plane and said fixed plane, as measured at the center of said rollers and radially inwardly of said right angle position along said fixed plane of said input race.

17. A transmission comprising input and output shafts, an input race secured to said input shaft for rotation therewith, an output race rotatably mounted on said input shaft, a plurality of tiltable rollers mounted in frictional contact at the edges thereof with said input and output races, means for tilting said rollers intermediate said input and output races, a planetary unit including ring, sun and intermediate planet pinion members, a carrier member for rotatably mounting and spacing said planet pinion members, said ring member being operatively connected to said output race for rotation therewith, said sun member being secured to said input shaft for rotation therewith, and clutch and clutch-actuating means for automatically connecting said carrier member to said output shaft for rotating said output shaft in one direction in response to the tilting of said rollers outwardly from center along the toroidal surface of said input race, and for automatically connecting said carrier member to said output shaft for rotating said output shaft in the opposite rotary direction in response to the tilting of said rollers through a first predetermined portion of the total available tilt angle range of said rollers inwardly from center along said toroidal surface of said input race, and for automatically disconnecting said carrier member from said output shaft in response to the tilting of said rollers through a second predetermined portion of the total available tilt angle range of said rollers inwardly from center along said toroidal surface of said input race.

18. A transmission comprising input and output shafts; an input race secured to said input shaft for rotation therewith; an output race rotatably mounted on said input shaft; a plurality of tilting rollers mounted intermediate said input and output races in frictional contact at the edges thereof with oppositely disposed toroidal surfaces formed on said input and output races; means for tilting said rollers radially inwardly and radially outwardly from center along said toroidal surfaces; a planetary unit including ring, sun and planet pinion members; a carrier member for rotatably mounting said planet pinion members in frictional contact with said ring and sun members, said ring member being rotatable in response to rotation of said output race, said sun member being secured to said input shaft for rotation therewith; and clutch and clutch-actuating means for automatically connecting said carrier member to said output shaft for rotating said output shaft in one direction in response to the tilting of said rollers through all radially outward positions of said edges of said rollers from center along said toroidal surface on said input race, and for automatically connecting said carrier member to said output shaft for rotating said output shaft in the opposite direction in response to the tilting of said rollers through a first predetermined portion of all radially inward positions of said edges of said rollers from center along said toroidal surface on said input race, and for automatically disconnecting said carrier member from said output shaft in response to the tilting of said rollers through the remaining portion of all radially inward positions of said edges of said rollers from center along said toroidal surface on said input race.

19. A transmission comprising input and output shafts, a toroidal roller section operatively connected to said input shaft, a planetary traction-drive section operatively connected to the output of said toroidal roller section, a friction clutch mechanism for connecting the output of said planetary traction-drive section to said output shaft for forward and reverse operation, and control means operatively connected to said toroidal roller section and to said friction clutch mechanism for providing a hydraulic signal to cause the engagement of said friction clutch mechanism during predetermined tilt angle ranges of said toroidal roller section.

20. The transmission described in claim 19, wherein said control means includes a servopiston movable in response to various engine parameters to set the required tilt angle of said rollers, ratio position valve means directly movable in response to movement of said servopiston to transmit a fluid pressure signal indicative of tilt angle, piston means for actuating said friction clutch mechanism, forward and reverse clutch valve means responsive to predetermined fluid pressures, manual selector valve means for receiving said fluid pressure signal from said ratio position valve means and directing same to one of said forward and reverse clutch valve means, said one of said forward and reverse clutch valve means directing said fluid pressure signal to said piston means for engagement of said friction clutch mechanism upon attainment of said predetermined fluid pressures, and a centrifugally actuated apply valve operatively connected between said forward and reverse clutch valve means and said piston means for controlling the application of said fluid pressure signal on said piston means in response to centrifugal force.

* * * * *